United States Patent Office 3,637,594
Patented Jan. 25, 1972

3,637,594
HIGH MOLECULAR WEIGHT AROMATIC POLYBENZOXAZINONES
Manfred Gallus, Gunter Lorenz, and Gunther Nischk, Dormagen, Germany, assignors to Farbenfabriken Bayer Aktiengesellschaft, Leverkusen, Germany
No Drawing. Filed May 29, 1969, Ser. No. 829,124
Claims priority, application Germany, June 10, 1968, P 17 70 608.0
Int. Cl. C08g 20/08, 33/02
U.S. Cl. 260—47 CP
10 Claims

ABSTRACT OF THE DISCLOSURE

High molecular weight aromatic polybenzoxazinones and a process for their production by polycondensation of aromatic diaminocarboxylic acids containing ether oxygen with aromatic dicarboxylic acid dihalides in polar organic solvents, and heating the polyamide carboxylic acids thus obtained at temperatures above 150° C. said polymers being useful in the form of films and foils.

---

The present invention relates to high molecular weight aromatic polybenzoxazinones and to a process for their production.

Polymers of high thermal stability which have been described in the literature include polybenzoxazinones, i.e. polymers which contain the following structural unit:

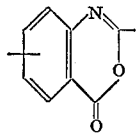

Thus, for example, the preparation of polybenzoxazinones from 4,4'-diaminobisphenyl-3,3'-dicarboxylic acid (benzidine dicarboxylic acid) and isophthaloyl chloride or terephthaloyl chloride has been described in J. Polymer Sci. A–1, 5, 2359 (1967).

These polymers, however, have various disadvantages. Thus, for example, benzidine dicarboxylic acid is a substance which is difficult to obtain in the pure state because of its comparative insolubility. Purification by repeated conversion into the hydrochloride and reprecipitation is only to be regarded as an emergency measure, and, when carried out on an industrial scale, it does not yield pure, uniform products. In the reaction with isophthaloyl or terephthaloyl chloride, polyamidocarboxylic acids are obtained, which are also sparingly soluble. To prepare solutions, e.g. in N-methylpyrrolidone-(2), the addition of salts such as lithium chloride or calcium chloride is necessary in order to prevent precipitation of the polymer. These polymer solutions which contain salts, however, cannot be spun by a dry spinning process or worked up into foils because the salt added remains in the polymer on evaporation of the solvent and adversely influences the mechanical properties.

It is an object of this invention to provide new high molecular weight aromatic polybenzoxazinones which do not have the disadvantages mentioned above. It is another object of this invention to provide a process for the production of these new polybenzoxazinones.

These objects are accomplished by high molecular weight aromatic polybenzoxazinones comprising recurring structural units of the general formulae selected from the group consisting of

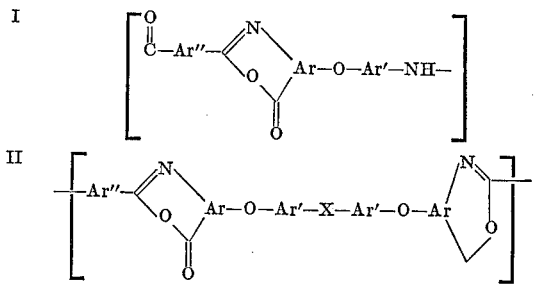

and mixtures of I and II, wherein

Ar, Ar' and Ar'' represent unsubstituted mononuclear or polynuclear, condensed or attached aromatic radicals, or said radicals substituted by halogen, $C_1$–$C_4$ alkyl, cycloalkyl or $C_1$–$C_4$ alkoxy groups, and X represents a single covalent bond, —$CH_2$—, —CO—, —O—, —S— or —$SO_2$—, said polybenzoxazinones having a softening point above 280° C.

The production of new high molecular weight aromatic polybenzoxazinones is accomplished by a process which comprises polycondensing aromatic diaminocarboxylic acids of the general formulae

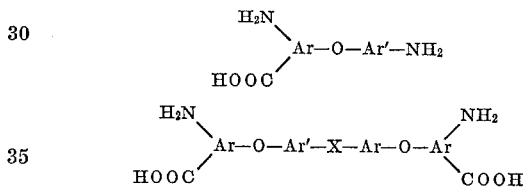

or mixtures thereof, wherein

X represents a single bond or —O—, —CO—, —S—, or —$SO_2$—,

Ar and Ar' represent unsubstituted mononuclear or polynuclear, condensed or attached aromatic radicals, or said radicals substituted by halogen, $C_1$–$C_4$ alkyl, cycloalkyl or $C_1$ to $C_4$ alkoxy groups, with aromatic dicarboxylic acid dihalides of the general formula

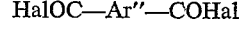

HalOC—Ar''—COHal wherein

A'' has the same meaning as Ar and Ar'' and Hal is a halogen atom, said polycondensing being carried out at temperatures of 0 to 60° C. in polar organic solvents, the polyamidocarboxylic acids thus obtained being heated to temperatures above 150° C. after removal of the solvent. In addition to the aromatic diaminocarboxylic acids mentioned above, the reaction mixture can also contain other aromatic diamines.

The aromatic diaminocarboxylic acids (anthranilic acid derivatives) used for the production of the polyamidocarboxylic acids in the first stage of the process according to the invention may be obtained, for example, by reacting hydroxyanthranilic acids in the form of their alkali metal salts with nitroaryl halides and reducing the nitro group to the amino group or, in the case of bis-anthranilic acid derivatives, by reacting these with reactive dihalogen compounds. Instead of the hydroxyanthranilic acids, the corresponding azo compounds may be used, and, in the reduction which then follows, both the nitro group and the azo group are converted into amino groups.

The following aminoaryloxy anthranilic acids and bis-anthranilic acids are mentioned as examples: 4,4'-diamino-3-carboxydiphenylether, 3,4'-diamino-4-carboxy-diphenyl ether,
4,4'-diamino-2'-chloro-3-carboxy-diphenylether,
3,4'-diamino-2'-chloro-4-carboxy-diphenylether,
4,4'-bis-(3-carboxy)-4-aminophenyloxy)-diphenylsulphone,
4,4'-bis-(3-carboxy-4-amino-phenoxy)-3,3'-dichloro-diphenylsulphone,
4,4'-bis-(4-carboxy-3-aminophenoxy)-diphenylsulphone and
4,4'-bis-(3-carboxy-4-aminophenoxy)-benzophenone.

These compounds can be used, either alone or in admixture with other aromatic diamines, of which the following may be mentioned as examples: m-phenylenediamine, p-phenylenediamine, 4,4'-diaminodiphenylether, 4,4'-diamino-diphenylmethane, 4,4'-diamino-diphenylsulphide and 4,4'-diamino-diphenylsulphone, which other aromatic diamines can be present in the reaction mixture in an amount of up to 95 mol percent, based on the total amount of diamines present, are reacted in known manner with any aromatic dicarboxylic acid chlorides, preferably with isophthaloyl chloride or terephthaloyl chloride, in polar organic solvents, preferably N,N-dimethylacetamide or N-methylpyrrolidone.

The temperature of polycondensation is 0 to 60° C., and it is advisable to cool the reaction vessel in order to remove the heat of reaction formed.

This method yields highly viscous, clear solutions of polyamidocarboxylic acids which can be worked up directly, for example, they can be spun by a wet or dry spinning process or cast to form foils or films.

The relative solution viscosities $\eta_{rel}$ of these polyamidocarboxylic acids as measured on a solution of 0.5 g. of the polymer in 100 ml. N-methylpyrrolidone at 20° C. are above 1.2.

It is desired to remove the hydrogen chloride formed during the reaction, the solution may be treated with epoxides in known manner to form the corresponding chlorohydrines. Alternatively, the polymer is precipitated by pouring into water, washed and dried and then redissolved in the same or some other suitable solvent. Examples of suitable solvents are N,N-dimethylformamide, N,N - dimethylacetamide, N - methylpyrrolidone and N-methylcaprolactam.

The addition of solubilising agents such as inorganic salts is not necessary.

The aromatic polyamidocarboxylic acids prepared in this way according to the invention contain recurring units of the general formula

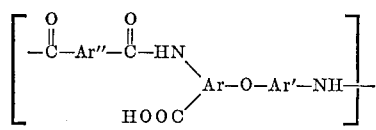

and/or

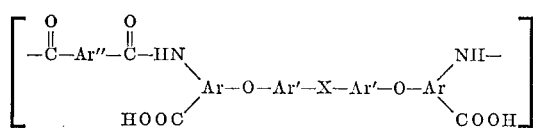

in which Ar" represents an aromatic radical which may be the same as Ar or Ar' or different, and Ar, Ar' and X have the meaning already indicated.

These polymers can be worked up from their solutions to form fibres, threads, films, foils, coatings, linings and similar products.

When heated to temperatures above 150° C., the polyamido carboxylic acids are converted into polybenzoxazinones which have recurring units of the general formulae

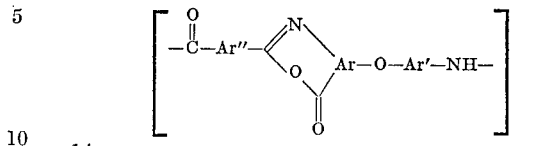

and/or

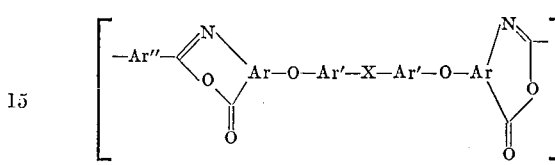

in which Ar, Ar', Ar" and X have the meaning already mentioned, water being split off in the process, and they are then particularly resistant to elevated temperatures. Polybenzoxazinones tolerate prolonged heating at 300° C. without suffering any substantial deterioration in their mechanical properties. Owing to the diarylether units contained in the polymer chains, the polymers prepared according to the invention are more flexible than those prepared from benzidine dicarboxylic acid. The melting point of the polybenzoxazinones is above 280° C.

The following examples are to further illustrate the invention without limiting it.

In the examples, parts by weight are related to parts by volume as kg. to litres.

EXAMPLE 1

585 parts by volume of anhydrous N-methylpyrrolidone and 108 parts by weight of terephtholoyl chloride are added to 130 parts by weight of 3-carboxy-4,4'-diamino-diphenylether of melting point 190 to 193° C. in a stirring apparatus cooled with ice. The temperature rises to 36° C. and a clear solution which gradually becomes more viscous is formed. As soon as the temperature has dropped to 25° C., stirring is continued at room temperature. After 3 hours, the highly viscous solution is diluted with 265 parts by volume of N-methylpyrrolidone, and about 55 parts by weight of ethylene oxide are introduced to remove the hydrogen chloride until a sample of the solution diluted with water is neutral in reaction.

A solution of a polyamidocarboxylic acid which has recurring structural units of the formula

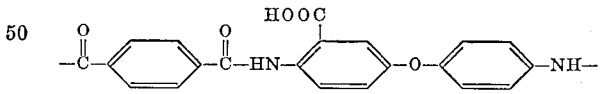

is obtained, which is clear above 50° C. The relative viscosity of a 0.5% solution of this polymer in N-methyl pyrrolidone at 20° C. is $\eta_{rel}=1.85$.

The major part of the solution is wet spun by the usual methods. The threads are stretched in the ratio of 1:2.5 at 280 to 320° C. and then have a strength of 2.3 g./tdex. The softening point is above 350° C.

The remainder of the solution is cast to form a foil of 20μ in thickness which is first dried for 3 hours at 150° C. and then tempered for 10 hours at 200° C. and for 10 hours at 250° C.

The yellow colour which progressively increases in intensity and the occurrence of the benzoxazinone band in the infra-red spectrum at 1760 cm.$^{-1}$ show that the polyamido carboxylic acid has been converted into a polybenzoxazinone. It contains recurring units of the formula

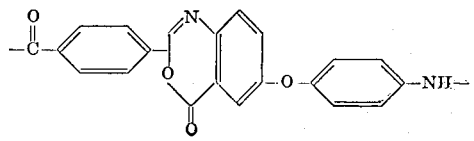

The softening point is above 350° C.

Preparation of 3-carboxy-4,4'-diamino-diphenylether (a) 2-carboxy-4-(p-nitrophenoxy)-azobenzene

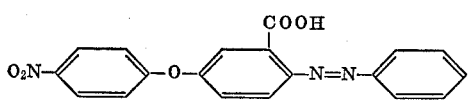

One part by weight of potassium hydroxide and 2.15 parts by weight of 2-carboxy-4-hydroxy azobenzene are dissolved in 22 parts by weight of dimethyl sulphoxide. Thereafter about 2 parts by weight of a mixture of dimethyl sulphoxide and water are distilled off in vacuo. After the addition of 1.60 parts by weight of 4-chloro-nitro-benzene the reaction mixture is stirred for 12 hours at 120° C. Thereafter the mixture is cooled and diluted with 40 parts by weight of ice water, 1 part by weight of active carbon is added and the solution is filtered. The filtrate is acidified by 20 percent hydrochloric acid and the precipitate is filtered off. After washing the precipitate with water it is recrystallized from ethanol. Yield: 2.80 parts by weight (87%). Melting point 182–186° C.

(b) 4,4'-diamino-3-carboxy-diphenylether

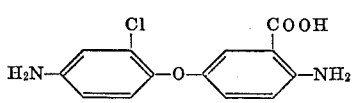

5.35 parts by weight of 2-carboxy-4-(p-nitro-phenoxy)-azobenzene dissolved in 24 parts by weight of dimethyl formamide are hydrogenated in the presence of 1 part by weight of Raney-nickel "B" at a temperature of about 60° C. and at a hydrogen pressure of about 60 atmospheres. When hydrogenation is finished a precipitate (probably a nickel salt) is filtered off and the filtrate is evaporated in vacuo. The residue and the precipitate are dissolved in warm 10 percent sodium hydroxide solution, while everything insoluble is separated. The filtrate is acidified with 10 percent hydrochloric acid to a pH value of 6. 2.63 parts by weight (76 percent) of 4,4'-diamino-3-carboxy-diphenylether are precipitated. Melting point 190–193° C.

EXAMPLE 2

2.795 parts by weight of 2-chloro-3'-carboxy-4,4'-di-amino-diphenylether of melting point 173–175° C. and 2.03 parts by weight of terephthaloyl chloride are introduced into 13 parts by volume of anhydrous N-methyl-pyrrolidone with cooling and vigorous stirring. When the exothermic reaction has died down, stirring is continued for 3 hours at room temperature. A highly viscous, clear solution of the polyamidocarboxylic acid is obtained, which has recurring units of the formula

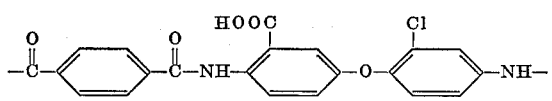

The relative viscosity of a 0.5% solution of this polymer in N-methylpyrrolidone at 20° C. is $\eta_{rel}=1.74$.

A foil 30μ in thickness is produced from the viscous solution and dried at 150° C. for 3 hours. The sample is then heated at 250° C. for 2 hours, and after 24 hours it is placed in a drying cupboard heated to 300° C. The foil, which now consists of a polybenzoxazinone, as confirmed by the appearance of a band at 1760 cm.⁻¹ in the IR spectrum, and which contains recurring units of the formula

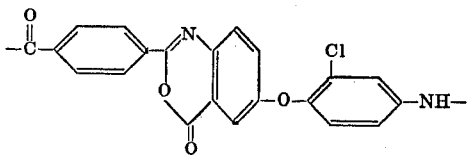

is not yet brittle after 400 hours at this temperature in the presence of atmospheric oxygen. The softening point is above 350° C.

Preparation of 2-chloro-3'-carboxy-4,4'-diamino-diphenylether (a) 2 - carboxy - 4 - (2' - chloro-4'-nitrophenoxy)-azobenzene

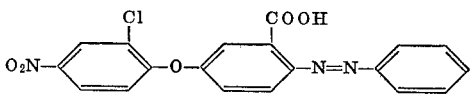

The procedure from Example 1 for the preparation of 2 - carboxy - 4-(p-nitrophenoxy)-azobenzene is repeated with the proviso that instead of 4-chloro-nitrobenzene 1.9 parts by weight 3,4-di-chloro-nitrobenzene is reacted. 2.80 parts by weight (79%) of 2-carboxy-4-(2-chloro-4-nitrophenoxy)-azobenzene are obtained. Melting point 150–151° C.

(b) 4,4'-diamino-2'-chloro-3-carboxy-diphenylether

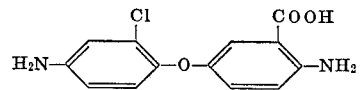

5.35 parts by weight of 2-carboxy-4'-(2'-chloro-4'-nitrophenoxy)-azobenzene dissolved in 25 parts by weight of methanol are hydrogenated in the presence of 1 part by weight of Raney-nickel "B" at a temperature of about 60° C. and at a hydrogen pressure of about 60 atmospheres. After hydrogenation is finished the Raney-nickel is filtered off. The filtrate is evapourated and the residue is recrystallized from acetonitrile after addition of active carbon. Yield: 3.07 parts by weight (82%). Melting point: 173 to 175° C.

EXAMPLE 3

A viscous solution of a polyamidocarboxylic acid which has recurring units of the formula

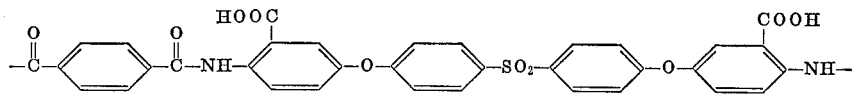

which solution is clear above 50° C., is prepared in the same manner as in Example 2 from 9.0 parts by volume of anhydrous N-methylpyrrolidone, 2.603 parts by weight of 4,4' - bis - (3-carboxy-4-aminophenoxy)-diphenylsulphone of melting point 218 to 220° C. and 1.015 parts by weight of terephthaloyl chloride. The relative viscosity of a 0.5% solution in N-methylpyrrolidone at 20° C. is $\eta_{rel}=1.83$.

A foil produced from this is dried for 4 hours at 140° C. and then heated, first at 180° C. for 4 hours, then at 220° C. for 4 hours and lastly at 280° C., and is left at this temperature in the presence of atmospheric oxygen. The yellow colour which starts to appear at 180° C. indicates the conversion into polybenzoxazinone, which is confirmed by the appearance of a band at 1760 cm.⁻¹ in the IR spectrum. It contains recurring units of the formula

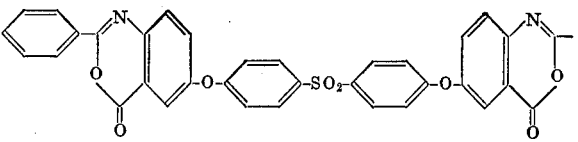

The dark yellow foil has a softening point of about 360° C. and is not yet brittle after 400 hours' tempering at 280° C.

Preparation of 4,4'-bis-(3-carboxy-4-amino-phenoxy)-diphenylsulfone (a) 4,4' - bis - (4-benzeneazo-3-carboxy-phenoxy)-diphenylsulfone

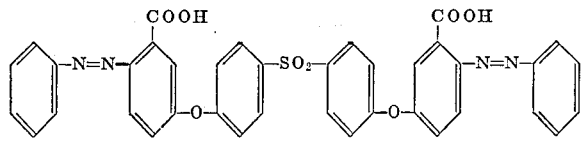

The procedure of Example 1 for the preparation of 2-carboxy-4-(p-nitro-phenoxy)-azobenzene is repeated with the proviso that instead of 4-chloro-nitrobenzene 1.02 parts by weight of 4,4-di-chloro-diphenyl-sulfone is reacted. After a reaction time of 36 hours at 125° C. 2.05 parts by weight (83%) of 4,4'-bis-(4-benzeneazo-3-carboxy-phenoxy)-diphenylsulfone are obtained after recristallization from a mixture of dimethylformamide and methanol. Melting point: 236 to 241° C.

(b) 4,4' - bis-(3-carboxy-4-aminophenoxy)-diphenylsulfone

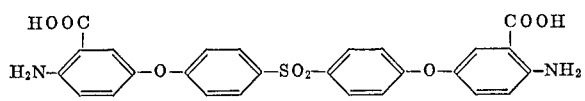

310 parts by weight of 4,4'-bis-(4-benzeneazo-3-carboxy-phenoxy)-diphenyl-sulfone are dissolved together with 40 parts by weight of sodium hydroxide in 3000 parts by weight of water. The mixture is hydrogenated in an autoclave after the addition of 60 parts by weight of Raney-nickel "B" at 70° C. and at a hydrogen pressure of about 60 atmospheres. From the filtered hydrogenation solution the product is precipitated with acetic acid and recrystallized from ethanol after the addition of active carbon. To the hot filtrate water is added until crystallization begins. Yield: 199 parts by weight (86%). Melting point: 218–220° C.

EXAMPLE 4

If instead of the terephthaloyl chloride used in Example 3, the same quantity of isophthaloyl chloride is used, and instead of N-methylpyrrolidone, the same quantity of anhydrous N,N-di-methylacetamide is used, a viscous solution which is clear at room temperature of a polyamidocarboxylic acid which has recurring units of the formula

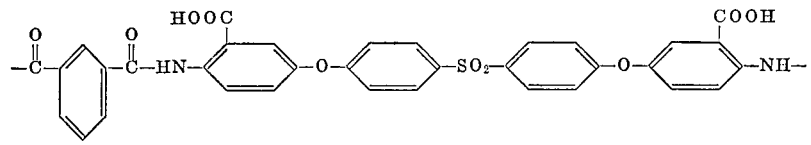

is obtained. The relative viscosity of a 0.5% solution in N,N-dimethylacetamide at 20° C. is $\eta_{rel}=1.70$.

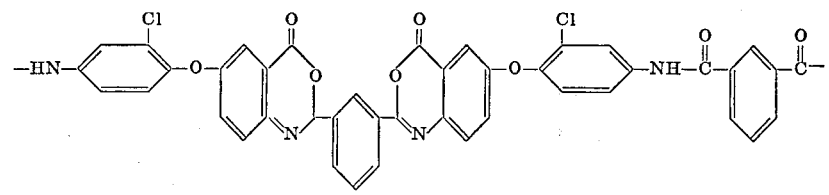

The film produced from this is subjected to the same heat treatment as the film from Example 3.

A polybenzoxazinone which has recurring units of the formula

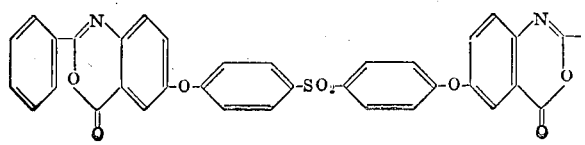

is produced, as indicated by the appearance of the band at 1760 cm.$^{-1}$ in the IR spectrum. The softening point is about 350° C. The foil is not yet brittle after 400 hours' tempering in air at 280° C.

EXAMPLE 5

40.6 parts by weight of isophthaloyl chloride are added at 0–15° C. to a solution of 18.30 parts by weight of m-phenylene diamine and 8.38 parts by weight of 2-chloro-3'-carboxy-4,4'-diamino diphenylether in 200 parts by volume of anhydrous N-methyl pyrrolidone while stirring and cooling. Within a few minutes a clear viscous polyamide solution is obtained which is precipitated after 4 hours into water. The polyamide thus obtained has recurring structural units of the formulae

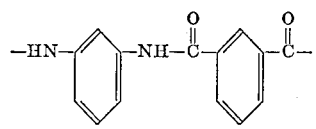

and

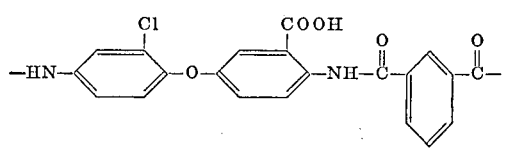

in a molar proportion of 17:3. It forms a clear solution in dimethylformamide. The relative solution viscosity $\eta_{rel}$ is 1.72 (measured on a 0.5% solution in N-methylpyrrolidone at 20° C.). A film produced from this solution is tempered in the usual way at 150, 200 and 250° C. and thereafter consists of recurring structural units of the formulae

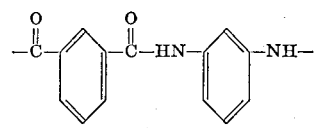

and

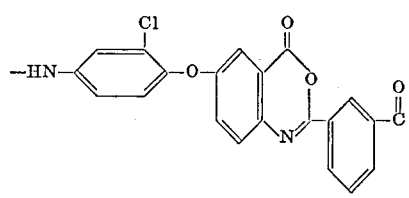

and

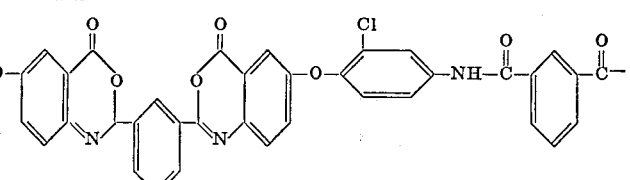

The softening point of this foil is above 350° C.

EXAMPLE 6

20.3 parts by weight of isophthaloyl chloride are added to a solution of 5.21 parts by weight of 4,4'-bis-(3-carboxy-4-aminophenoxy)diphenylsulfone and 18.02 parts by weight of 4,4'-diaminodiphenylether in 130 parts by volume of anhydrous N,N-dimethyl acetic acid amide while stirring and cooling. The solution thus obtained, which becomes viscous, is stirred for another 4 hours.

The polyamide thus obtained and which can be precipitated as described in Example 5 consists of recurring structural units of the formulae

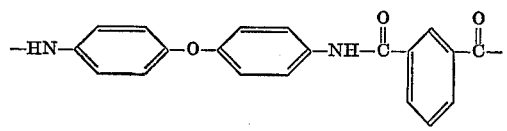

and

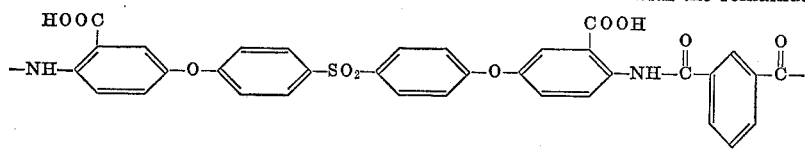

in a molar proportion of 9:1.

The rel. solution viscosity $\eta_{rel}$ (measured on a 0.5% solution in N-methylpyrrolidone at 20° C.) is 1.83. From the solution a foil being 50μ thick is produced and tempered for 3 hours at 150° C., 200° C. and 250° C. respectively. Thereafter the film is left at a temperature of 300° C. After 170 hours no embrittlement of the film can be observed. The polymer consist after tempering of recurring structural units of the formulae

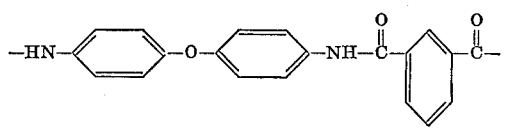

and

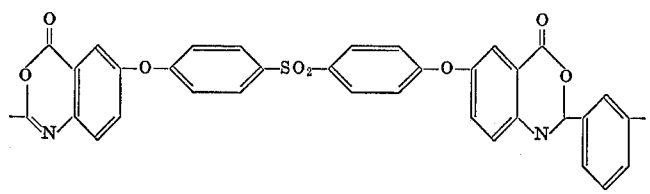

and

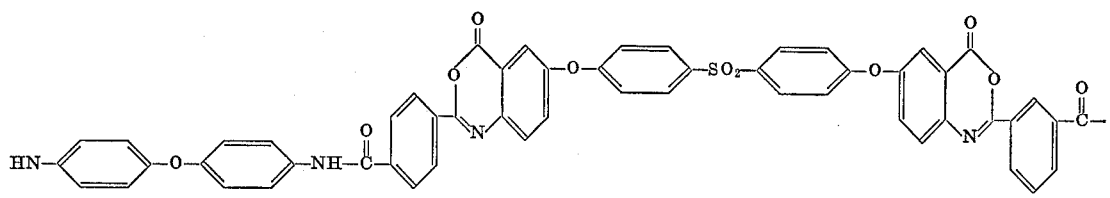

The softening point is above 350° C.

What we claim is:

1. A high molecular weight aromatic polybenzoxazinone consisting essentially of recurring structural units having a general formula selected from the group consisting of (I)

(I) 

and (II) 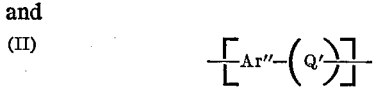

and mixtures of I and II wherein Q is 5–100 mole percent of units

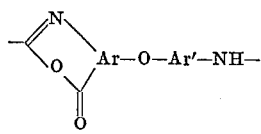

with the remainder being selected from the group consisting of —CONH—Y—NH where Y is phenylene, diphenylene ether, diphenylene methane, diphenylene sulfide or diphenylene sulfone; Q' is 5–100 mole percent of units

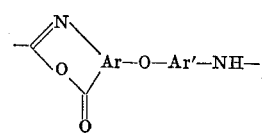

with the remainder being selected from the group consisting of CONH—Y—NH—CO where Y is phenylene, diphenylene ether, diphenylene methane, diphenylene sulfide, or diphenylene sulfone;

where

Ar, Ar', and Ar'' are phenylene or phenylene substituted by a member selected from the group consisting of halogen, $C_1$–$C_4$ alkyl and $C_1$–$C_4$ alkoxy groups;

X is a single covalent bond, —$CH_2$—, —CO—, —O—, —S—, or —$SO_2$—, said polybenzoxazinone having a softening point above 280° C.

2. A polybenzoxazinone of claim 1 where the recurring structural unit is I.

3. A polybenzoxazinone of claim 1 where the recurring structural unit is II.

4. A polybenzoxazinone of claim 1 where the recurring structural unit is both I and II.

5. A polybenzoxazinone of claim 2 where Q is 100% of said units

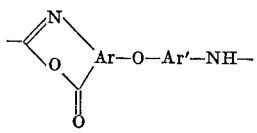

6. A polybenzoxazinone of claim 3 where Q' is 100% of said units

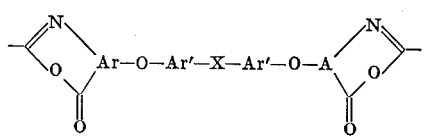

7. A polybenzoxazinone of claim 4 where Q is 100% of said units

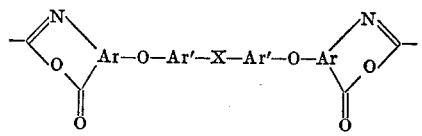

and Q' is 100% of said units

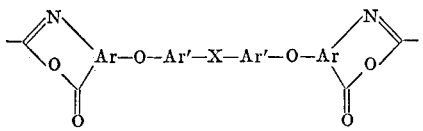

8. A polyamidocarboxylic acid consisting essentially of recurring structural units having a general formula selected from the group consisting of III 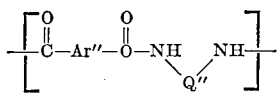

and

IV 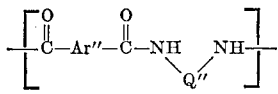

and mixtures of III and IV, wherein Q" is 5-100 mole percent of the units

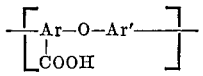

and Q''' is 5-100 mole percent of the units

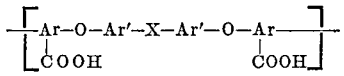

with the remainder of said Q" and Q''' being selected from the group consisting of phenylene, diphenylene ether, diphenylene methane, diphenylene sulfide, and diphenylene sulfone;

wherein

Ar, Ar' and Ar" are phenylene or phenylene substituted by a member selected from the group consisting of halogen, $C_1$-$C_4$ alkyl, and $C_1$-$C_4$ alkoxy groups, X is a single covalent bond —$CH_2$—, —CO—, —O—, —S—, or —$SO_2$— said polyamidocarboxylic acid having a relative solution viscosity $\eta_{rel}$ of above 1.2 (as measured on a solution of 0.5 g. of the polymer in 100 ml. N-methyl pyrrolidone at 20° C.).

9. Fibres consisting of high molecular weight polybenzoxazinones according to claim 1.

10. Foils consisting of high molecular weight polybenzoxazinones according to claim 1.

References Cited

UNITED STATES PATENTS 3,386,965  6/1968  Huffman et al. _____ 260—78
3,468,851  9/1969  Yoda et al. _____ 260—78

WILLIAM H. SHORT, Primary Examiner

L. L. LEE, Assistant Examiner

U.S. Cl. X.R.

117—161 P; 260—30.2, 32.6 N, 63 N, 65, 78 A 78 TF

UNITED STATES PATENT OFFICE
CERTIFICATE OF CORRECTION

Patent No. 3,637,594 (829,124    Dated 25 January 1972

Inventor(s) Gallus, Manfred, et al

It is certified that error appears in the above-identified patent and that said Letters Patent are hereby corrected as shown below:

| COLUMN | LINE | ERROR |
|---|---|---|
| 2 | Formula 1 | " 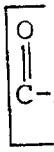 " should read --- 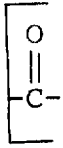 ---. |
| 2 | Formula II | " 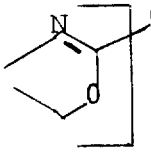 " should be --- 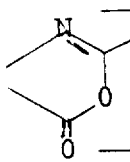 --- |
| 2 | 50 | " "A" has the same ... as Ar & Ar " should read --- Ar" has the same ... as Ar & Ar'.--- |
| 4 | 35 | "terephtholoyl" should read ---terephthaloyl --- |
| 4 | 58 | "2.3g./tdex" should read --- 2.3g/dtex --- |

FORM PO-1050 (10-69)

UNITED STATES PATENT OFFICE
CERTIFICATE OF CORRECTION

Patent No. 3,637,594 (829,124)    Dated January 25, 1972

Inventor(s) Gallus, Manfred et al.    Page - 2

It is certified that error appears in the above-identified patent and that said Letters Patent are hereby corrected as shown below:

| COLUMN | LINE | ERROR |
|---|---|---|
| 4 | 70-75 formula | " [structure] " should be --- [structure] --- |
| 5 | formula under (b) | " [structure with Cl] " should be --- [structure without Cl] --- |

UNITED STATES PATENT OFFICE
CERTIFICATE OF CORRECTION

Patent No. 3,637,594 (829,124)     Dated 25 January 1972

Inventor(s) Gallus, Manfred, et al     Page - 3

It is certified that error appears in the above-identified patent and that said Letters Patent are hereby corrected as shown below:

| Column | Line | Error |
|---|---|---|
| 8 | Last Formula | |

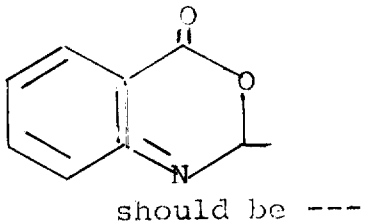

should be ---

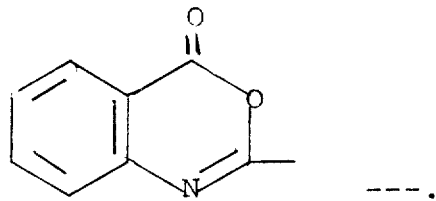

---.

| 9 | 2nd formula | " |

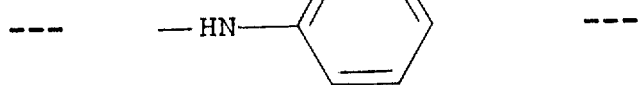

should be

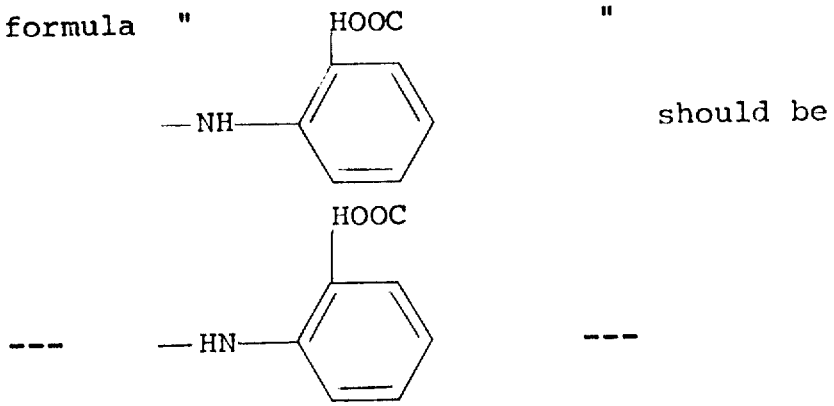

---

UNITED STATES PATENT OFFICE
CERTIFICATE OF CORRECTION

Patent No. 3,637,594 (829,124)   Dated 25 January 1972

Inventor(s) Gallus, Manfred et al.   Page - 4

It is certified that error appears in the above-identified patent and that said Letters Patent are hereby corrected as shown below:

| COLUMN | LINE | ERROR | | |
|---|---|---|---|---|
| 9 | last formula before claims | 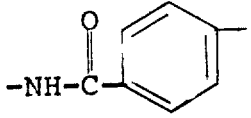 | should be --- | 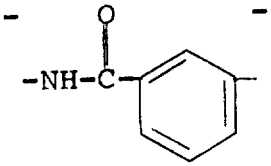 --- |
| 10 | claim 6 formula | 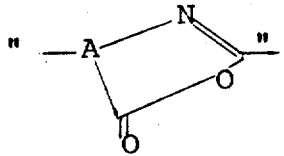 | should be --- | 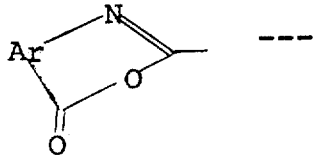 --- |
| 11 | claim 8 formula III |  | should be --- |  --- |
| 11 | claim 8 formula IV | 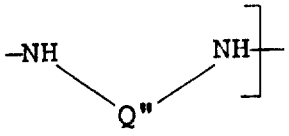 | should be --- | 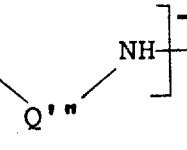 --- |

Signed and sealed this 13th day of November 1973.

(SEAL)
Attest:

EDWARD M. FLETCHER, JR.
Attesting Officer

RENE D. TEGTMEYER
Acting Commissioner of Patents